United States Patent [19]

Farrell

[11] 3,998,577
[45] Dec. 21, 1976

[54] TEMPERATURE CONTROLLED CORE ROD
[75] Inventor: John Jerome Farrell, Greenbrook, N.J.
[73] Assignee: Consupak, Inc., Morristown, N.J.
[22] Filed: Oct. 31, 1975
[21] Appl. No.: 627,608
[52] U.S. Cl. .................. 425/387 B; 425/DIG. 204; 425/DIG. 208
[51] Int. Cl.² ........................................ B29C 17/07
[58] Field of Search ............. 425/387 B, DIG. 208, 425/DIG. 204, 392

[56] References Cited
UNITED STATES PATENTS

| | | | |
|---|---|---|---|
| 3,114,596 | 12/1963 | Wechsler et al. | 425/DIG. 208 |
| 3,116,877 | 1/1964 | Moslo | 425/387 B |
| 3,740,180 | 6/1973 | Sidur | 425/DIG. 204 |
| 3,796,531 | 3/1974 | Bowers | 425/DIG. 204 |
| 3,827,214 | 8/1974 | Naumann | 425/387 B |
| 3,836,305 | 9/1974 | Grazine | 425/242 B |
| 3,923,441 | 12/1975 | Farrell | 425/DIG. 208 |

FOREIGN PATENTS OR APPLICATIONS

| | | | |
|---|---|---|---|
| 1,131,251 | 10/1956 | France | 425/DIG. 208 |
| 944,616 | 12/1963 | United Kingdom | 425/DIG. 208 |

Primary Examiner—Richard B. Lazarus
Attorney, Agent, or Firm—Marvin Feldman

[57] ABSTRACT

A core rod for an injection molding machine having an axially disposed blow air conduit connected to a valve at the free end of the core rod, and an annular passageway around the air conduit for flow of a temperature control fluid. The temperature control fluid is preferably channeled in a two-pass or alternatively in a double-spiral flow pattern. This core rod is particularly suited for use in biaxial orientation blow molding wherein rapid and accurate temperature control of the parison is required.

8 Claims, 6 Drawing Figures

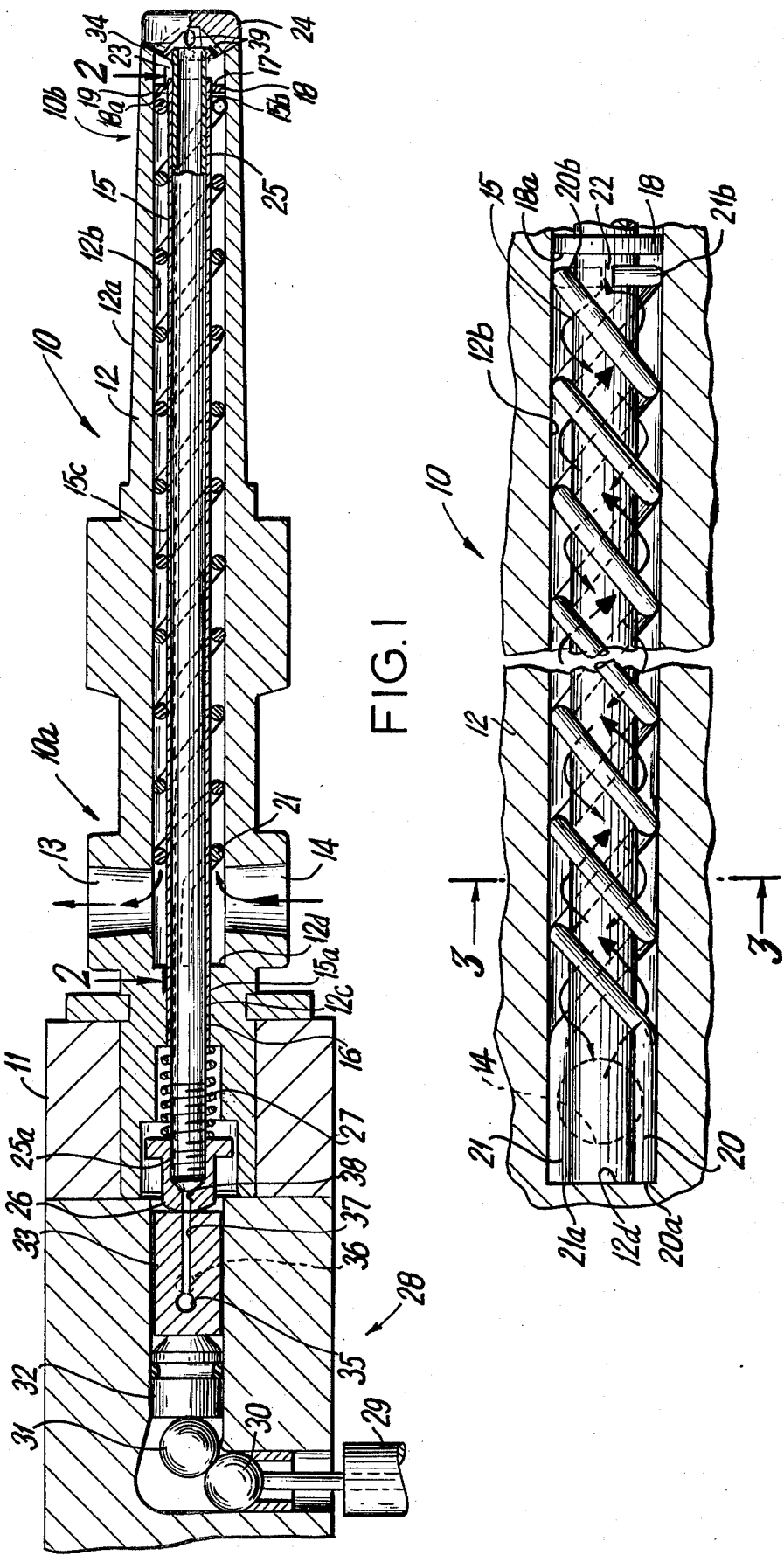

TEMPERATURE CONTROLLED CORE ROD

This invention relates to core rods for use with injection blow molding machines for making hollow articles such as containers. More particularly this invention relates to core rods through which a temperature control fluid flows for ready heat transfer from a parison.

Heretofore in an attempt to provide core rods with a temperature control fluid, such prior art core rods were formed with axially disposed temperature control fluid conduits with annularly disposed air channels. Fluid conduits created a condition wherein the temperature control fluid was both remote from the parison outside the core rod while being insulated from the parison by the annular air channel around the axially disposed fluid conduit. One such core rod is disclosed in U.S. Pat. No. 3,116,877 granted Jan. 7, 1964.

It has been found that in certain injection blow molding operations particularly wherein biaxial orientation is desired, it is necessary to readily condition the parison to the specific desired temperature for biaxial orientation in blow molding. To achieve this it is desired to provide a core rod which provides highly response heat transfer with the parison. This is particularly so in balloon blow molding wherein the balloon serves to insulate the parison from the core rod.

Now therefore it is an object of this invention to provide a core rod in which there is ready heat transfer with the parison thereon.

It is a further object of this invention to provide a core rod having a temperature control fluid flow pattern which increases the heat transfer character of the core rod.

It is still a further object of this invention to provide a core rod with an axially disposed blow air conduit in combination with a radially spaced annular temperature control fluid conduit.

It is still a further object of this invention to provide a core rod as aforesaid in which there is a two-pass flow of the temperature control fluid.

It is still a further object of this invention to provide a core rod as aforesaid in which there is a spiral flow of the temperature control fluid.

It is still a further object of this invention in which the temperature of the blow air may be readily controlled by the aforesaid fluid flow.

Another object of this invention is to provide a core rod which is readily useful with injection blow molding machine and yet such core rod is readily fabricated and of relatively inexpensive construction as well as being practical in design and operation.

Further objects and advantages of the present invention will become apparent from the following description and the accompanying drawings which illustrate certain presently preferred embodiments of the invention and wherein:

FIG. 1 is a sectional elevational view of the core rod of this invention;

FIG. 2 is an enlarged sectional view taken along line 2—2 of FIG. 1;

Figure 6:
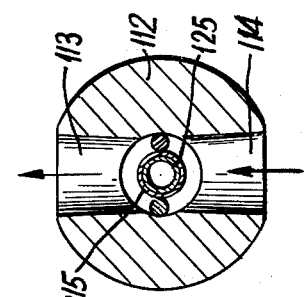
FIG. 6 is a partial sectional view taken along line 6—6 of FIG. 5.

Referring now to FIG. 1 there is shown the core rod of this invention generally designated as 10. Core rod 10 comprises a neck end portion 10a fixedly mounted to horizontally rotatable indexing head 11, and a free end or unsupported portion 10b. Core rod 10 comprises a tubular housing 12 having an outer surface 12a for supporting a parison (not shown), and an inner tubular surface 12b for cooling fluid flow. Further core rod housing 12 is formed with two transversely disposed fluid conduits; namely upper conduit 13 and low conduit 14 for purposes hereinafter appearing.

A hollow tubular member 15 is axially fixedly disposed within core rod 10. The neck end portion 15a of member 15 is soldered as at 16 to inner tubular surface 12c, thereby fluid-sealing that end of member 15, and free end portion 15b of member 15 is soldered as at 17 to annular member 18, which member 18 is in turn soldered at 19 to inner tubular surface 12b. By this manner of construction a tubular channel is formed between the outside surface 15c of member 15; the inner tubular surface 12b of core rod housing 12; the inner end face 18a (FIG. 2) of member 18; and core rod neck end shoulder 12d.

Figure 3:
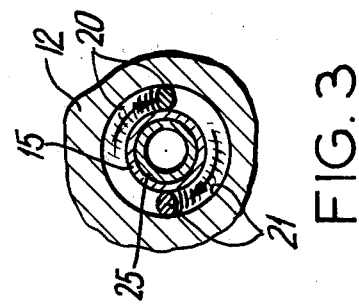
FIG. 3 is a reduced scale sectional view along line 3—3 of FIG. 2.

Referring now to FIGS. 1 and 2, there is shown a pair of wires 20 and 21 wrapped around surface 15c of tubular members in a double helix configuration forming two helical channels along the length of surface 15c, beginning at ends 20a and 21a, respectively, abutting shoulder 12d, and terminating at free ends 20b and 21b, respectively. Ends 20b, are spaced from and opposed annular face 18a of member 18, thereby forming a transversely disposed fluid flow channel 22. Wires 20 and 21 are forcibly wedged between opposed surfaces 12b and 15c by heat shrinking the core rod on the wires. This technique creates a fluid seal at the contacting surfaces of 21 and 21 with 15c and 12b (FIG. 3).

By the aforesaid manner of construction a series of fluid flow channels are formed. A cooling fluid may be supplied to the core rod through conduit 14, through the first helical channel (as shown in dark arrows); to channel 22 and then to the second helical channel (as shown in light arrows); and then out of the core rod through conduit 13. Thusly the cooling fluid is circulated in a continuous counter-current manner providing rapid and even cooling to the core rod and in turn the parison mounted thereon.

Figure 4:
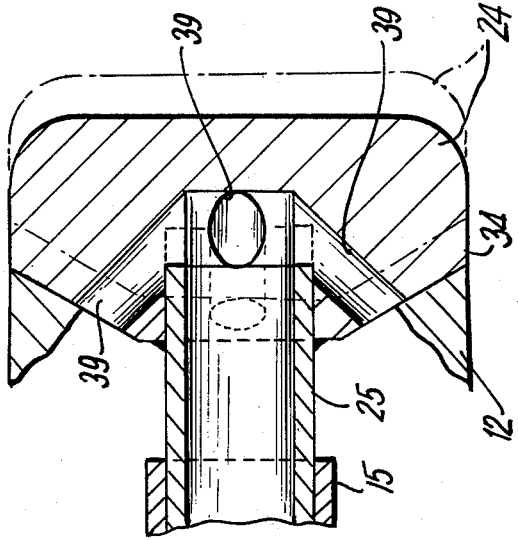
FIG. 4 is an enlarged view of the valve construction of FIG. 1.

Referring now to FIGS. 1 and 4 there is shown a reciprocating blow air supply valve generally designated as 23 is slidably, reciprocably mounted within inner surface 15d of tubular member 15.

Valve 23 comprises a valve head 24, a hollow valve stem 25 integrally connected to head 24, an adjustable nut 26 threaded to the neck end 25a of stem 25, a compression spring 27; and a trigger bar mechanism 28.

Trigger bar mechanism 28 is more fully described in U.S. Pat. No. 3,836,305 granted Sept. 17, 1974. Briefly, the trigger bar mechanism 28 comprises a time operated plunger 24, a series of balls 30, 31, movable by flanges 29; the balls in turn abutting and in turn moving cylinder 32 and in turn block 33. Block 33 in turn moves nut 26, stem 25, compressing spring 27, and moving valve head 24 so as to provide an air inlet opening 34 between the valve head 24 and core rod housing 12. The dotted line construction of FIG. 4, depicts the opened valve. In moving block 33, block orifice 35 becomes contiguous with blow air supply orifice 36. In this manner with the valve opened, blow air under pressure is supplied through orifice 36 to orifice 35, to block channel 37, to nut channel 38, through hollow stem 25, to four valve head orifices 39 (typical), through inlet opening 34, for blowing the parison.

In operation a parison is injection molded on surface 12a of core rod 10. Thereafter the parison and core rod are removed from the opened injection mold, all in the conventional manner. Now to provide rapid cooling of the parison, a cooling liquid such as water at about 40° F is circulated through inlet 14, through a first helical path formed between wires 20 and 21, through vertical channel 22, to a second helical path formed between said wires 20 and 21 and out of the core rod through outlet 13. Even rapid cooling of the core rod and parison is thus provided. Once the parison has reached its desired lowered temperature, trigger bar mechanism 28 is actuated to provide blow air from the inside of core rod through the valve head to the parison to blow same.

Figure 5:
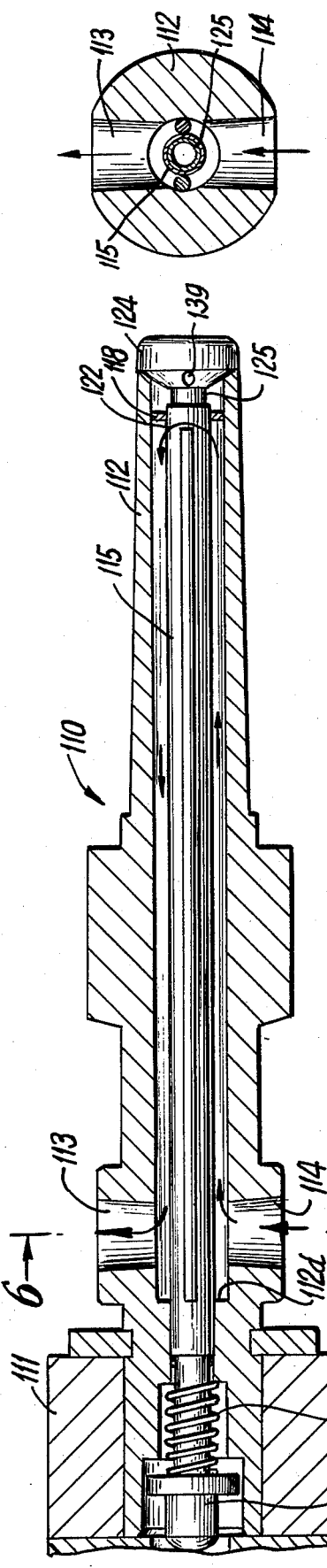
FIG. 5 is a partial sectional elevational view of another embodiment of the core rod and with core rod internal elements in full view.

Referring now to FIGS. 5 and 6 there is shown an alternate embodiment 110 of the present invention. In making reference to FIGS. 5 and 6 those elements similar to the corresponding elements of FIGS. 1–4 are denoted by the same number with prefix numeral "1".

In this latter embodiment, wires 50 and 51 and deformably wedged in the annular space between core rod housing 112 and tubular member 115, and said wires are disposed 180° on opposite sides of member 115. Further at the neck end, wires 50, 51 abut shoulder 112d, and at the free end a vertical channel 122 is formed between the free ends of the wires and the opposed annular member 118.

By this manner of construction, cooling water enters inlet 114 passes through lower annular channel 52, through vertical connecting channel 122, to upper annular channel 53, and through outlet 113. Thus there is a rapid two-pass flow effect through the core rod.

It is within the contemplation of this invention that the cooling fluid, be in addition to water other collants including both gases and liquids and mixtures thereof.

It will be understood that many changes in the details of the invention as herein described and illustrated may be made without, however, departing from the spirit thereof or the scope of the appended claims.

What is claimed is:
1. A core rod for an injection blow molding machine comprising an outer tubular member for receiving a parison having one end for mounting to the molding machine and the other end being the free end, a blow air inlet valve being mounted at the free end, an inner tubular member, the outside of said inner tubular member and the inside of said outer tubular member forming an annular passage for the flow of a temperature control fluid and an axially disposed tubular air conduit slidably disposed in said inner tubular member, said air conduit being connected to said valve for movement therewith, and further comprising means to move said conduit in the axial direction so as to form a blow air opening between said valve and the free end of the tubular member.

2. The core rod of claim 1, further comprising means to prevent the temperature control fluid within the annular passage from contacting said air inlet valve.

3. The core rod of claim 1, further comprising baffle means disposed in said annular passage.

4. A core rod for an injection blow molding machine comprising an outer tubular member having one end for mounting to the molding machine and the other end being the free end, a blow air inlet valve being mounted at the free end, an inner tubular member, the outside of said inner tubular member and the inside of said outer tubular member forming an annular passage for the flow of a temperature control fluid and an axially disposed tubular air conduit slidably disposed in said inner tubular member, said air conduit being connected to said valve for movement therewith, thickness baffle means comprising at least two spaced rods, the thickness of each of said rods being about equal to the annular passage width, and wherein each of the spaced rods intimately contacts the respective tubular members, so as to prevent flow of fluid between the rod and the respective tubular members while permitting flow between the spaced rods.

5. The core rod of claim 4, wherein the two rods are in spaced parallel disposition on opposed sides of the conduit to form separate passages for fluid flow.

6. The core rod of claim 4, wherein the two rods are in spaced parallel disposition in a double lead helix configuration forming two spiral channels in the annular passage one spiral channel for fluid flow toward the free end and the other spiral channel being for fluid flow return from the free end.

7. The core rod of claim 1, said valve having passage therethrough communicating with the conduit and the opening.

8. The core rod of claim 2, wherein said means to prevent the fluid comprises an annular plate integrally bonded to the respective tubular members adjacent the valve.

* * * * *